United States Patent [19]

Vermesse

[11] Patent Number: 4,931,943

[45] Date of Patent: Jun. 5, 1990

[54] FRANKING MACHINE PROVIDING A PERIODIC HISTORICAL TRAIL

[75] Inventor: Bernard Vermesse, L'Hay les Roses, France

[73] Assignee: Societe Anonyme dite : SMH Alcatel, Paris, France

[21] Appl. No.: 174,755

[22] Filed: Mar. 29, 1988

[30] Foreign Application Priority Data

Mar. 31, 1987 [FR] France ............................ 87 04479

[51] Int. Cl.$^5$ ............................................. G07B 17/00
[52] U.S. Cl. ................................. 364/464.02; 364/518
[58] Field of Search ..................... 101/45; 235/381; 364/464.02, 464.03, 466, 518

[56] References Cited

U.S. PATENT DOCUMENTS

| | | | |
|---|---|---|---|
| 4,319,328 | 3/1982 | Eggert | 364/466 |
| 4,377,214 | 3/1983 | Hansen et al. | 364/464.03 X |
| 4,511,793 | 4/1985 | Racanelli | 235/375 |
| 4,627,016 | 12/1986 | Kirschner et al. | 364/900 |
| 4,731,575 | 3/1988 | Sloan | 235/381 X |
| 4,731,749 | 3/1988 | Kirschner et al. | 364/900 |
| 4,760,534 | 7/1988 | Fougere et al. | 364/464.03 X |
| 4,807,139 | 2/1989 | Liechti | 380/25 X |
| 4,823,283 | 4/1989 | Diehm et al. | 364/518 |

FOREIGN PATENT DOCUMENTS

| | | |
|---|---|---|
| 0172573 | 2/1986 | European Pat. Off. . |
| 0172574 | 2/1986 | European Pat. Off. . |
| 3517087 | 11/1986 | Fed. Rep. of Germany . |
| 2032224 | 4/1980 | United Kingdom . |
| 2057169 | 3/1981 | United Kingdom . |
| 2066736 | 7/1981 | United Kingdom ........... 364/464.02 |

Primary Examiner—Parshotam S. Lall
Assistant Examiner—Edward R. Cosimano
Attorney, Agent, or Firm—Sughrue, Mion, Zinn, Macpeak & Seas

[57] ABSTRACT

A franking machine comprising a microprocessor (5), control memories (6, 7) and a working memory (8), together with at least one first non-volatile memory (9) for recording the meters of the machine, said memory being a machine state memory, characterized in that it further includes a second non-volatile memory (10) for recording at defined time intervals successive machine state trails in a plurality of compartments, said trail memory being updated and consulted under the control of the control memories (6, 7). The machine state trail can thus be consulted and optionally printed out.

20 Claims, 8 Drawing Sheets

FRANKING MACHINE PROVIDING A PERIODIC HISTORICAL TRAIL

REFERENCE TO RELATED APPLICATIONS

This application relates to application Ser. No. 174,746, filed Mar. 29, 1988, entitled "A COUPLING CIRCUIT FOR NON-VOLATILE MEMORIES IN AN ELECTRONIC MACHINE, AND A FRANKING MACHINE APPLYING SAID CIRCUIT", to the same applicant and assigned to the common assignee, and application Ser. No. 174,759, filed Mar. 29, 1988, entitled "A LIMITED WRITE NON-VOLATILE MEMORY AND A FRANKING MACHINE MAKING USE THEREOF", also to the same applicant and assigned to the common assignee.

The present invention relates to franking machines and in particular to means for keeping an account of the machine state of each machine over time. It relates both to post-payment machines and to pre-payment machines and it keeps said account on a periodic basis as a function of defined events.

BACKGROUND OF THE INVENTION

In post-payment franking machines, the postal administration or one of its services in charge of a number of franking machines requires monthly returns from each user of daily readings of the machine's up meter state. The up meter gives the total value of franking operations performed by the machine as franking takes place.

These readings are entered into a sheet referred to in France as the "fiche mensuelle de dépôt" (i.e. monthly filing sheet). The sheet is filled in on a daily basis.

It is used for billing purposes.

At the end of each day, the user enters on the sheet by hand:

the state of the machine up meter; and the daily expenditure of the machine which is obtained by taking the difference between the state that has just been entered and the previously entered state.

At regular intervals (with allowance being made for public holidays) the user gives the filled-in sheet to the service in charge of the machine.

In addition to the above items, further information is written on the sheet by the user. This comprises:

the name and address of the user;

the up meter total (also known as the "index") at the end of the previous reporting period;

the date of the end of the current reporting period;

the number of the machine; and its expenditure during the current reporting period, for example monthly expenditure obtained by summing the daily expenditures which appear on the sheet.

The user must also cause a zero value stamp to be franked in the top righthand corner of the sheet, thereby enabling the postal administration to check print quality.

Advantageously, the sheet is numbered. It is taken from a pad and each sheet is associated with a duplicate retained by the user.

These sheets which are used for billing each user for the value of postage franked during the reporting period are also used for monitoring consistency of expenditure from the daily readings, for the purpose of detecting attempts at fraud and possibly for providing a basis on which a compromise settlement can be reached on the probable amount of expenditure to be billed.

This procedure of filling in sheets is awkward for the user who must do it on a daily basis and also for the postal service which makes use of the sheets. Further, sheets may be badly filled in, they may be unreadable or incomplete or they may contain errors. A postal service employee has to correct errors and omissions, and where necessary go to the user's premises in order to verify and complete the information on the sheet. This checking and error correction delays billing.

In addition to these drawbacks related to the apparent quality of a filled-in sheet, the postal service must also key in the data entered on the sheets prior to making out the corresponding bills. Further checking is performed at this stage, in particular to verify a degree of consistency between the expenditure to be billed this time and previously billed expenditures.

If any new problem should occur, a postal service employee must likewise visit the user, thereby giving rise to a further delay in billing.

In addition to delays in billing, such actions require the postal service to have a large number of employees engaged on checking and correction operations.

With pre-payment franking machines, the conventional practice is to cause the machines to lock up when the value to be franked exceeds the amount of credit remaining in the machine concerned.

The user must therefore refill the machine with credit from time to time as a function of machine utilization.

In pre-payment machines, a historical account is normally available of the total value of franking operations performed by the machine, of the total value of credit ever loaded into the machine, and of the credit balance remaining. It is also common for the total number of pieces franked to be made available as well, with all of said quantities enabling the operation of each machine to be checked. By comparing the value of a franking operation to be performed with the value of the remaining balance, the machine is capable of locking up, where necessary. This historical accounting also allows the postal service to verify that the machine is being used properly. The values are checked as a general rule, whenever the machine receives new credit. They may also be verified on specific requests and/or during a visit by the postal service to the user.

The checking performed is based on consistency between the total value of the credits successively loaded into the machine as recorded by a cumulative meter and the total value of franking operations performed as recorded by the up meter plus the state of the down meter which ought to correspond to the difference between the states of the cumulative meter and the up meter. These checks are performed on the basis of the states of the meters as conveyed to the postal service each time the meter is loaded with credit, even if it is the user who directly performs the operation of loading the machine with credit. It is therefore important for the credit-loading means to remain under the control of the postal service.

Thus, credit-loading means may make use of a telephone link between the user and a postal service processing center. A special interchange procedure is established between the user and the processing center during which the states of the meters are transmitted to the center together with the requested new amount of credit to be loaded, these amounts are recorded at the center and authorization is given to the user to load the requested amount of credit.

In a variant, these means may make use of a credit loading card which includes at least one memory. The card is placed alternatively in a read/write terminal at the processing center and in a read/write terminal on the franking machine. The card is suitable for being written to irreversibly by the processing center to provide directives, such as a defined amount of credit to be loaded into the machine, and by the machine to specify its various states. The card allows the machine to read information written therein by the center and it allows the center to read information written therein by the machine.

The checks on machine operation performed by the postal service are then performed at the processing center on the basis of the data it receives.

In the event of anomalies being detected or in the event of a machine breakdown, a postal service employee visits the user.

Nevertheless, these various checks are not completely satisfactory in avoiding possible attempts at fraud concerning the amount of credit actually loaded into the machine by the user. It remains difficult to establish a satisfactory compromise settlement between the postal service and the user.

The object of the present invention is to provide a franking machine providing increased security and enabling a reliable prior state to be found at any time, and consequently making it possible to establish automatically the monthly filing sheets required for post-payment machines or to perform verifications or checks on the credit-loading operations actually performed by the user, with said checks being performable at any moment and not only at the times when credit is loaded.

SUMMARY OF THE INVENTION

The present invention provides a franking machine providing a historical trail, the machine comprising a microprocessor and, connected to said microprocessor: a stamp print head; a keyboard; a calendar clock; a control memory; a working memory; at least one first non-volatile memory referred to as the machine state memory for recording the state of the machine meters corresponding to the last franking operation performed; and a second non-volatile memory referred to as the trail memory, having at least a first memory space organized as a plurality of identical compartments which are individually addressable by first updating control means for writing in said first memory space, said updating means being triggered at time intervals specific to said first memory space for recording data relating to the machine state at the instants concerned in the various compartments thereof, said machine being characterized in that it further includes second control means for consulting each first memory space, said second control means controlling the addressing of the compartments thereof in order to read the trail recorded in the "consulted" compartment, i.e. in that one of the compartments which is being addressed, and in that said second control means include a text memory belonging to said control memory and containing firstly a first message which is accessible by means of a menu key on said keyboard and which defines a sequence of special operations for the machine, said operations being split into a sequence of first screens capable of being displayed on at least one line comprising a plurality of alphanumeric characters on an alpha-numeric display connected to the microprocessor, with at least one of said first screens corresponding to a machine state trail consultation operation which may be selected by means of a digit key of said keyboard for designating said operation, and also containing, for use during trail consultation, a second message constituted by a sequence of second screens successively displayable on the display when the consultation operation has been selected, with some of said second screens displaying the trail recorded in the consulted compartment, and with other screens defining proposals for changing the compartment being consulted, with each of said proposals being selectable by means of a corresponding key designated together with the proposal concerned when the proposal is displayed.

According to another characteristic, said franking machine is characterized in that it further includes an alphanumeric printer coupled to said microprocessor, and in that one of said second screens including a print proposal selectable by depressing a digit key associated with said print operation and designated in conjunction therewith, causing said printer to print out a sheet when said proposal is selected.

A franking machine according to the invention can thus be used in post-payment operation to record the data required for making out meter reading sheets, in particular, and in prepayment operation to record data relating to successive amounts of credit, in particular, to enable them to be obtained at will by a simple consultation operation guaranteeing a secure and reliable meter reading together with an option for automatic printing.

BRIEF DESCRIPTION OF THE DRAWINGS

An embodiment of the invention is described by way of example with reference to the accompanying drawings, in which.

MORE DETAILED DESCRIPTION

Figure 1:
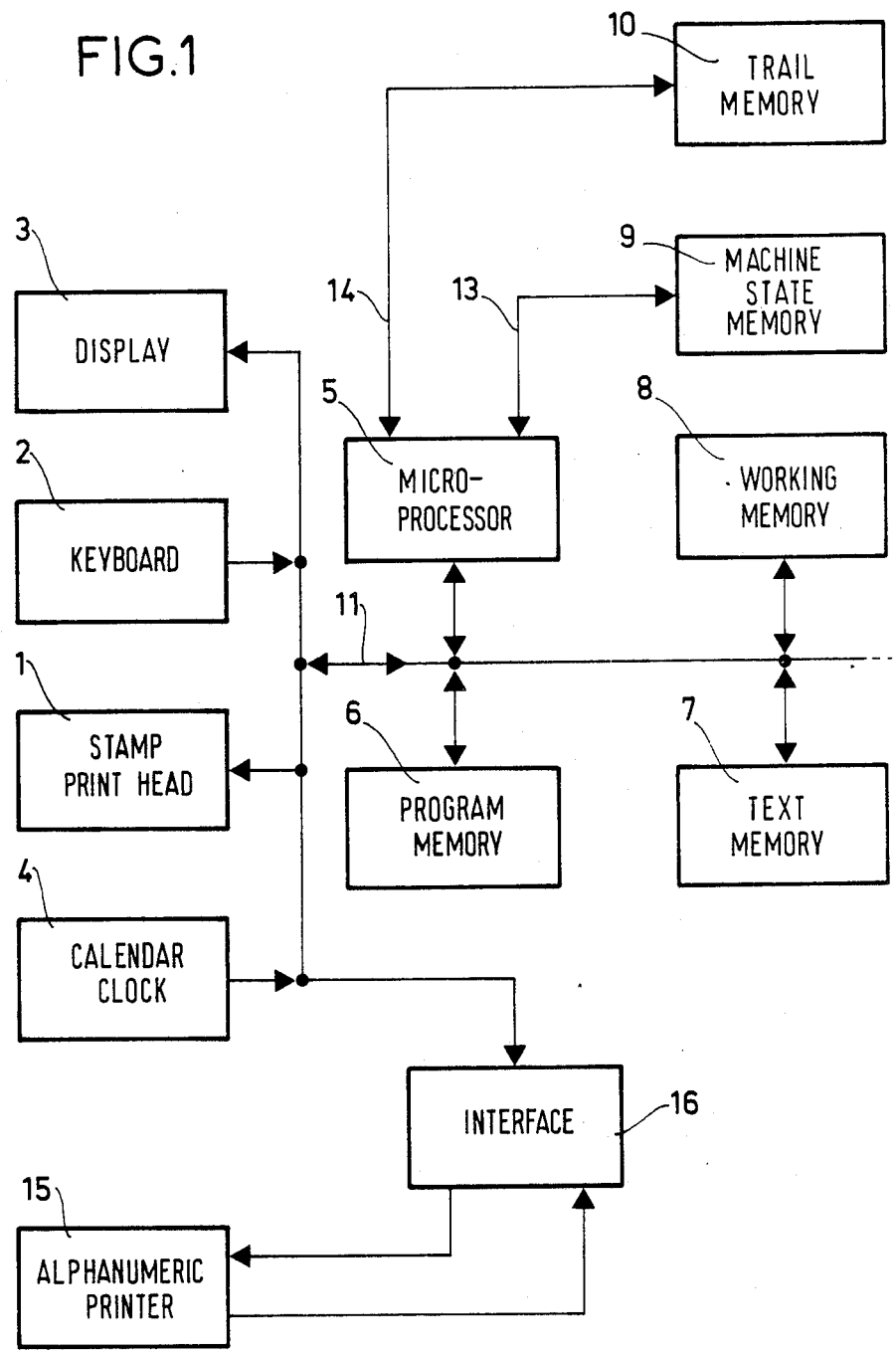
FIG. 1 is a block diagram illustrating a franking machine in accordance with the invention.

FIG. 1 is a block diagram of a franking machine in accordance with the invention and shows that the machine comprises:

a print head 1 for printing suitable value postage stamps on mail, either with or without an advertising message;

a keyboard 2 serving in particular for controlling the print head to select the amount of postage to be printed;

a display 3 for displaying information of use to the user;

a calendar clock 4 for establishing date information in the form of data relating to the hour, the minute, and the second; the day, the month, and the year;

a microprocessor 5 constituting electronic logic for controlling the machine and for controlling interchanges of information between the circuits of the machine;

one or more control memories constituting a program memory 6 and a text memory 7, which are shown as being separate; and one or more working memories constituting a working memory per se 8, a machine state memory 9, and a machine state trail memory 10.

The circuits or devices 1 to 4 and the memories 6, 7, and are connected to the microprocessor 5 by a two-way bus 11, while the state memory and the trail memory are also connected to the microprocessor but advantageously over respective specific two-way buses 13 and 14 which are distinct from the bus 11.

The franking machine further includes, as shown in FIG. 1, an alphanumeric printer 15 coupled to the bus 11 via an interface circuit 16.

In FIG. 1, the memories 9 and 10 are shown as being distinct from each other and from the working memory 8 in order to facilitate comprehension, given that they have specific functions.

In practice, both of the memories 9 and 10 may be contained in the same memory, or they may be split up differently, or they may be at least partially contained in the working memory 8.

FIG. 1 shows only one memory 9 for recording the machine state. In practice, the memory 9 is one of a pair of memories which are identical and which are loaded with the same data but over separate buses for well-known security reasons.

The working memory 8 is a random access memory (RAM) which receives and delivers control data under the control of the microprocessor 5 and the memories 6 and 7.

The machine state memory 9 and the trail memory 10 are non-volatile memories, being constituted by battery backed-up RAM or by electrically erasable programmable read only memory (EEPROM). They are shown in greater detail below with reference to FIG. 3 for the memory 9 and with reference to FIG. 4 for the memory 10.

The program memory 6 and the text memory 7 are read only memories (ROM) for control purposes. The memories 7 and 8 are shown in greater detail below with respect to that portion of their contents which applies to the present invention, with reference to FIGS. 5, 6, 7, 8, 9, and 10.

The alphanumeric printer 15 is connected to a connector of the interface circuit 16. This printer may be a CITIZEN type IDP-560RS printer, for example. It has two print modes: a graphic mode and an alphanumeric mode. In alphanumeric mode it can print a line of 40 consecutive characters. In graphic mode it can advantageously print coded data, in particular in the form of bar codes, as described below.

The keyboard 2 and the display 3 are described with reference to FIG. 2 which shows them as being a keyboard-and-display assembly.

The keyboard 2 has 16 keys and may include four additional keys shown in dashed lines beneath the 16 above-mentioned keys. The display 3 is of the alphanumeric type.

The alphanumeric display serves to display one or more lines each having 16, 20, or 40 alphanumeric characters. For example, it may be a display as sold by EPSON or by DENSITRON CORPORATION and it is suitable for displaying all of the characters in the ASCII code (CCITT code No. 5 ).

It serves to display messages in the clear and enables the operator to select one of the proposals contained in a displayed message, with each of the possible proposals being associated with one of the digit keys on the keyboard for selection purposes. The messages provide continuous operator guidance.

In the following description, the display is assumed to be capable of displaying two lines of 16 alphanumeric characters each. The messages are thus split up into screens, with each screen making full use of the display capacity, i.e. 32 characters in this example, and with each screen appearing on the display for a certain length of time and with the screens scrolling one after the other. The time each screen appears depends on the qualitative importance of the proposal contained therein. Depending on the screen, the display time may be 1, 2, or 3 seconds. This time is fixed by a program. At the end of the display time for the last screen of a message, the first screen of the same message reappears. The sequence of screens in each message is looped and the screens scroll automatically and repetitively until the operator uses the keyboard.

The keyboard 2 has sixteen keys, which are not given individual references since they have key markings, as follows:

ten digit keys marked 0, 1, . . . , 9, which enable an operator to enter a value, e.g. the value of a stamp to be franked, and also to select one of the proposals contained in a displayed message, with each proposal being associated with the number of its select key;

a key marked CANCEL which serves to cancel the current action or proposal or which serves to return the machine to its initial state which is the state for entering the value of a stamp to be franked;

a key marked ENTER which is used to confirm a selection or a stamp value as keyed-in by the operator;

a star key marked * which, when used simultaneously with the ENTER key, serves to confirm an instruction to change machine function;

a menu key marked M giving access to a first message defining the special operations or main proposals which are specific to the menu; and two scrolling keys, one marked with a down arrow and the other with an up arrow which serve to interrupt automatic screen scrolling, or else to cause the screens to scroll at the rate desired by the operator, either in the normal order or else in the reverse order.

Figure 2:
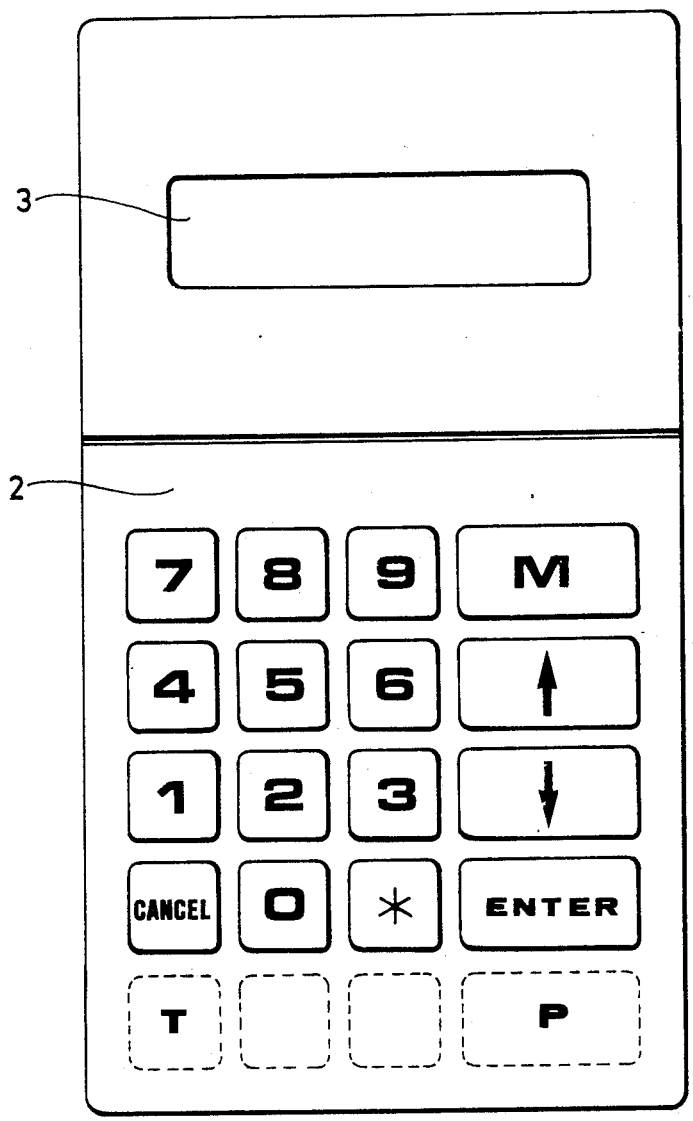
FIG. 2 shows a display and keyboard taken from the FIG. 1 block diagram.

The keyboard 2 may also include four additional keys which are shown in dashed lines in FIG. 2, and which are located beneath the sixteen keys. These additional keys may be attributed to various different machine functions. Only two of these four additional keys are identified, namely:

a key marked T enabling the operator to put the machine into a mode for consulting the trails recorded in the machine; and a key marked P enabling the operator to put the machine into a print mode using the printer 15. Such printing for making out meter reading sheets constitutes one of the special operations which the machine can perform or one of the stages in a possible special operation.

For each machine function, franking or special operations, only those keys which are useful with respect to the propositions of the currently displayed message are active.

Depressing any other key has no effect. Only the Cancel key is always active. Indicator lamps (not shown) associated with the various keys may be used to tell the operator which keys are currently active, thereby providing assistance to the operator.

Figure 3:
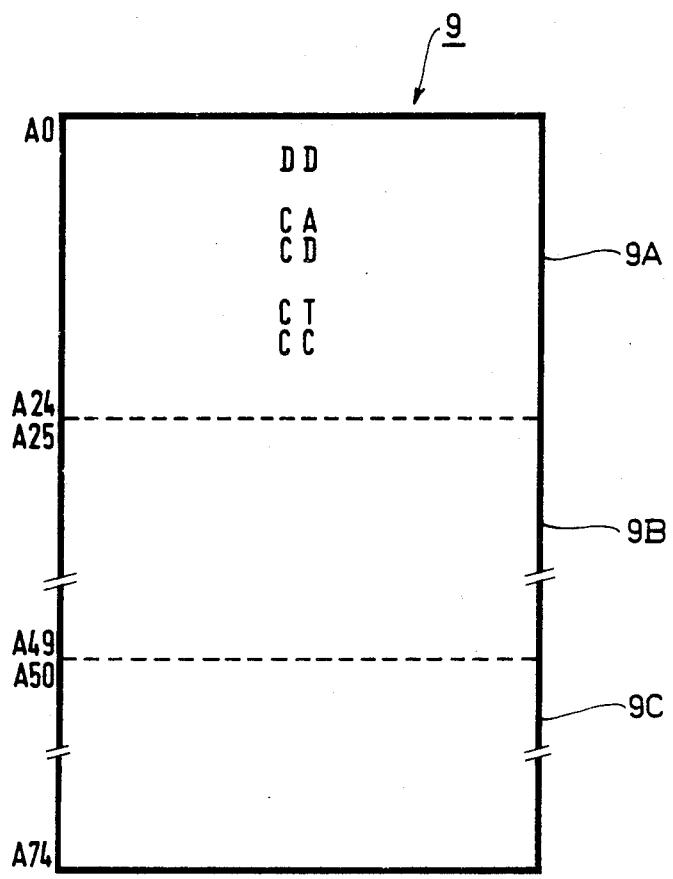
FIG. 3 shows one of the "state memory" memories of the franking machine together with the immediate trail.

FIG. 3 shows the machine state memory 9 which is also organized as an immediate trail memory for the machine state during the two most recently performed franking operations. It has a memory space 9A which is attributed, in particular, for recording the up meter CA, the down meter CD, the cumulative meter CT, and the piece-count meter CC for counting the number of franking cycles performed by the machine. The up meter defines the total value of franking operations performed, the down meter defines the value of the credit remaining, the cumulative meter defines the total value of credit ever loaded into the machine, and the piece count meter defines the number of franking operations performed. The states of these meters constitute the state of the machine at each franking operation. They are recorded one after another on five bytes each for the up meter CA, the down meter CD, and the cumulative meter CT, and on four bytes for the piece-count meter CC, and in each case the meter values are preceded by data relating to the date and referenced DD, said data occupying six bytes and indicating the year, the month, the day, the hour, the minute, and the second. All of this data is recorded in memory space 9A.

Memory space 9A is called the machine state space, and in the example given it occupies 25 bytes.

The memory 9 has two other memory spaces 9B and 9C which are identical to the memory space 9A. They are used for recording the two machine states immediately preceding the current state which is recorded in 9A. In other words memory spaces 9B and 9C contain the immediate trail of the machine state concerning the most recent franking operations.

The memory 9 operates as a shift register. For each operation which causes the machine state to change, i.e. each franking operation and each occasion on which credit is loaded into the machine, the machine state accompanied with the date data is loaded into memory space 9A after previously transferring the old contents of memory space 9B into memory space 9C, and the old contents of memory space 9A into memory space 9B.

In a variant, the memory 9 may be operated as a looped register, with memory spaces 9A, 9B, and 9C being successively loaded with the current state of the machine, such that at any moment, the memory 9 contains said current state together with the two immediately preceding states. It may also operate as a looped register for memory spaces 9B and 9C while its memory space 9A is independent from the looped register and remains fixed for recording the current state of the machine.

Naturally, the memory 9 may contain a larger number of memory spaces for recording the immediate trail of the machine state covering a larger number of franking operations. However, this number should remain limited to a few.

In FIG. 3, the bytes in memory space 9A have their addresses referenced A0 to A24, with A25 to A49 indicating the addresses of the bytes in memory space 9B, and a50 to a74 indicating the addresses of the byte in memory space 9C.

Figure 4:
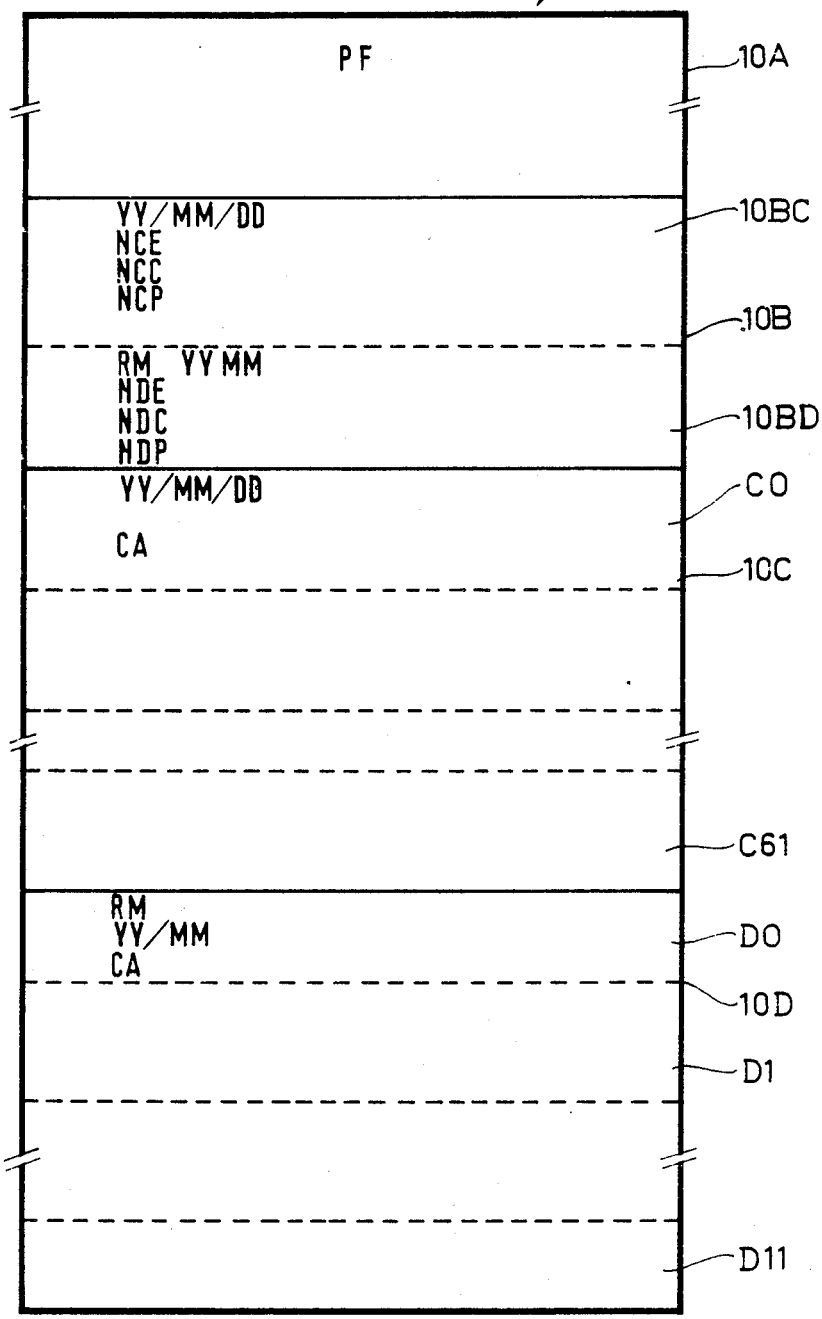
FIG. 4 shows another memory, namely the machine state trail memory of the franking machine.

The trail memory 10 is describer with reference to FIG. 4. This example concerns the case where the memory 10 is designed to store daily trails of the machine's up meter state together with monthly trails for use in a post-payment machine. It is also assumed that the memory 10 further contains parameters and variables described below and required for keeping the trail, but it should be understood that all or a part of the memory 10 may be contained in the working memory 8.

The trail memory 10 is organized as four spaces referenced 10A, 10B, 10C, and 10D. Memory space 10A is used for recording fixed parameters specific to the machine and its user. Memory space 10B is used for recording variables specific to keeping the accounting trail and to consulting it. Memory space 10C is used for recording the daily trail of the machine state as given by its up meter. Memory space 10D is used for recording the monthly machine state trail.

The daily machine state trail is constituted by date data "YY/MM/DD" together with the appropriate state of the machine up meter CA. The monthly trail is similar but in addition to the machine state given at the end of the month, it includes the number of the monthly trail concerned as defined for the various monthly trails by the order in which they are recorded.

The first memory space 10A for parameters specific to the machine and the user is loaded once and for all under the control of an operator when the franking machine is put into service.

When the machine is put into service, the operator sets the clock/calendar. The operator also enters parameters specific to the machine and to the user into the machine so as to identify the machine and its use. These parameters include the name and address of the user, the number of the machine, and co-ordinates such as the number of the postal center to which the machine is attached, in particular, which co-ordinates may already be loaded in some prior machines. In addition to these parameters, the operator enters parameters specific to the operating mode in accordance with the invention for establishing meter readings, in particular the number of the first meter reading sheet to be established, and the number of the day on which sheets are to be made out. All of these parameters constitute fixed data referenced PF and stored in the first memory space 10A. This first memory space 10A has 128 bytes for this purpose. After being recorded, this data is verified.

While the machine is being put into service, the operator also performs other normal operations, in particular that the meters or the machine state memory and the other memories are cleared, i.e. reset to zero. The franking machine is then sealed and is ready for use.

Memory space 10C for the daily trail of the machine state is organized as 62 identical compartments C0 to C61. Their numbers in order are given by C followed by a variable from 0 to 61. Each of them occupies eight bytes, i.e. three bytes for date data representative of the year YY, the month MM, and the day DD, and five bytes for the state of the machine at said date as given by its up meter CA. These compartments provide for 62 successive recordings at a rate of one per day, with each record being made on the first occasion that the machine is switched on any given day. These compartments are filled in sequentially as a closed loop. The contents of these compartments provide a trail of the machine state on a daily basis for not less than two months of machine use.

Memory space 10D for recording monthly machine states is organized as 12 identical compartments referenced D0 to D11. Each of these compartments is eight bytes long comprising two bytes for date data YY, MM, five bytes for the state of the machine CA at said date, and one byte for the rank RM of the machine state in question in a sequence of these recordings taken together over a period of time. These compartments provide for 12 successive recordings performed at monthly intervals and they follow one another in order with the 12 compartments being taken to be in a closed loop. The contents of these compartments provides a monthly trail of the machine state over a period of one year's machine use.

Memory space 10B is used for recording variables specific to keeping the daily and monthly trails contained in 10C and 10D and to consulting them. To this end it is organized as two comparable zones 10BC and 10BD, one relating to memory space 10C and the other to memory space 10D.

The variables recorded in zone 10BC are the date of the last write operation in space 10C, occupying three bytes YY/MM/DD, the numerical position 0 to 61 of the compartment which was last written to, occupying one byte referenced NCE, the rank number of the consulted compartment expressed as one byte referenced NCC, and the number of the compartment preceding the consulted compartment and expressed on one byte reference NCP.

The variables recorded in the zone 10BD are analogous. They include the last write date referenced YY/MM. occupying two bytes preceded by the rank RM of the last recorded monthly trail, the number of the compartment concerned by said last write, the number of the compartment being consulted, and the number of the preceding compartment, with the D compartment numbers lying in the range 0 to 11 being expressed as one byte each having the following references: NDE; NDC; and NDP respectively.

The memory space 10B is a working memory space directly concerned with updating and consulting memory spaces 10C and 10D. That is why it is shown in association therewith in FIG. 4 Memory space 10A is also a memory space related to spaces 10C and 10D and that is why it is associated therewith.

In operation, the user may use the franking machine for normal franking operations which constitute the main design purpose of the machine, however, the operator may also use the machine for special operations, and in particular, in accordance with the invention, an operation consisting in consulting the trail memory 10, to observe all or a part of its contents, and also in consulting the memory 9.

The special consultation operation may be made available via additional key T on the keyboard ad provided for that purpose.

However, it is preferable for the special operation of consulting the trail memory 10 and of consulting the memory 9 to belong to a set of special operations proposed by menu messages. Normal franking operations are also defined in one or more other messages depending on the specific franking operations to be performed.

As described in (French) patent application No. 87 02 667 filed in the name of the present Applicant, these various messages are contained in the text memory and they are split up into one or more limited size screens each of which can be individually displayed on the display. Each limited size screen is constituted, for example, by two lines each comprising 16 characters, assuming that the display is capable of displaying two lines of 16 characters, and each of the 32 screen characters is recorded as a single byte in the text memory. Selection between having successive messages relating to normal franking operations or having messages that relate to special operations is performed using the menu key. The menu key gives access to various proposals relating to special operation messages.

The way in which this selection is made is recalled briefly. An initial message is always displayed on the display each time the machine is switched on, or after the date has been verified on the first occasion that the machine is switched on a given day, or else after a deliberate interruption of normal franking operations performed by the user by means of the keyboard's Cancel key.

The initial message defines a possible option between franking or performing special operations. It appears on the display in the form of one screen or several successive screens. The menu key gives access to special operations.

The enter key leaves the machine ready to perform normal franking operations.

The contents of the text memory 7 and the contents of the program memory 8 are described below, but solely with respect to operations related to keeping the machine state trail and to consulting it, which operations concern the present invention, together with indications, where appropriate, on how these operations are selected from the message which proposes them to the user, followed by a description of how they run thereafter.

Figure 5:
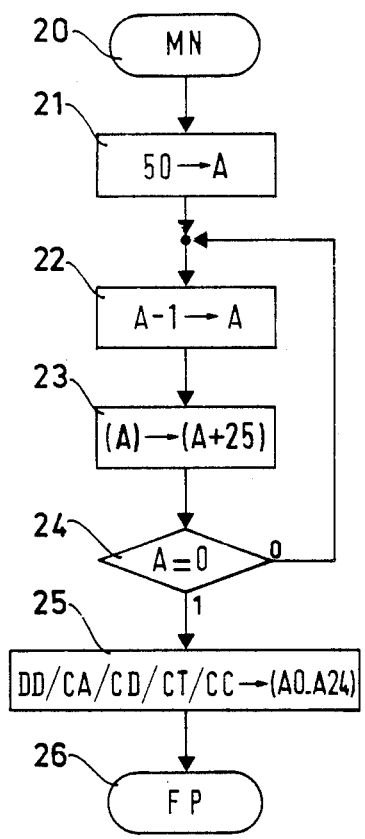
FIG. 5 is a flow chart showing how the state of the machine and its immediate trail are controlled in the FIG. 3 memory.

FIG. 5 is a flow chart showing how the immediate trail of the franking machine state is kept up-to-date in memory 9 of FIG. 3.

This function is provided by a program contained in the program memory 6. It is triggered automatically on each franking operation while a message MN belonging to the set of successive messages relating to franking operations is being displayed.

This message MN comprises two screens which are displayed in succession:
Screen 1 Stamp=XXXX
Screen 2 Frank or Cancel In this message, the previously entered and confirmed stamp value is displayed in the clear. Only the Cancel key on the keyboard is active, with failure to cancel constituting confirmation that franking is to take place and causing the immediate trail updating program to be run.

The immediate trail updating program is run from an initial stage 20 referenced MN in FIG. 5. It is executed using one byte from the working memory 8 to designate the corresponding addresses A in memory 9. The successive instructions of this program and the way they run are as follows:
Instruction 1:
set the address designated A in memory 9 to 50 during a stage 21 marked 50→A.
Instruction 2:
decrement address A by 1 in a stage 22 marked A - 1→A; read the byte at address A and transfer it to address A+25 during a stage 23 marked (A)→(A+25).
Instruction 3:
compare A with 0 in a stage 24 marked A=0; and if A=0 move onto instruction 4;
else A is not equal to 0 so loop to instruction 2.

Instruction 4:

read the calendar clock image providing date data DD and copy to addresses A=0 to A=5;

read the up meter state CA from addresses A=6 to A=10, add the value of the stamp, and write the resulting state back to the same addresses A=6 to A=10;

read the down meter state CD from addresses A=11 to A=15, subtract the value of the stamp, and write the results back to the same addresses A=11 to A=15;

read the cumulative meter state CT from addresses A=16 to A=20, subtract the value of the stamp and write the result back to the same addresses A=16 to A=20 (for a cumulative meter that works with negative numbers); and read the state of the cycle meter at addresses A=21 to A=24, increment by one and write back to the same addresses A=21 to A=24.

A stage 25 marked DD, CA, CD, CT, CC→(A0–A24) represents these actions of instruction 4.

Instruction 5:

go to the end of the program FP at stage 26.

With reference to the flow chart of FIG. 5 and the following figures, it is also specified that the day data DD is acquired from the calendar clock by a special program also contained in the program memory 6. This data acquisition program is described in the above-mentioned patent application and consists in the microprocessor 5 reading the contents of registers in the calendar clock and in writing them to bytes reserved for this purpose in the working memory 8. They constitute an electronic image in the RAM of the calendar clock and this image is copied into the memory 9.

In FIG. 5 and the following figures, it is also specified that the decision stages in the flow of a program are represented by diamond-shaped lozenges. The outputs from these lozenges are marked 1 to mean "yes" and 0 to mean "no".

By keeping this trail of the immediate state of the machine, it is possible to reconstitute a prior state of the machine reliably in the event of a fault or breakdown, thereby making it possible for the user and the postal service to reach a compromise. It provides a considerable increase in operating security. Access to the immediate trail of the machine state, which is a security measure, is described below with reference to FIG. 10.

Figure 6:
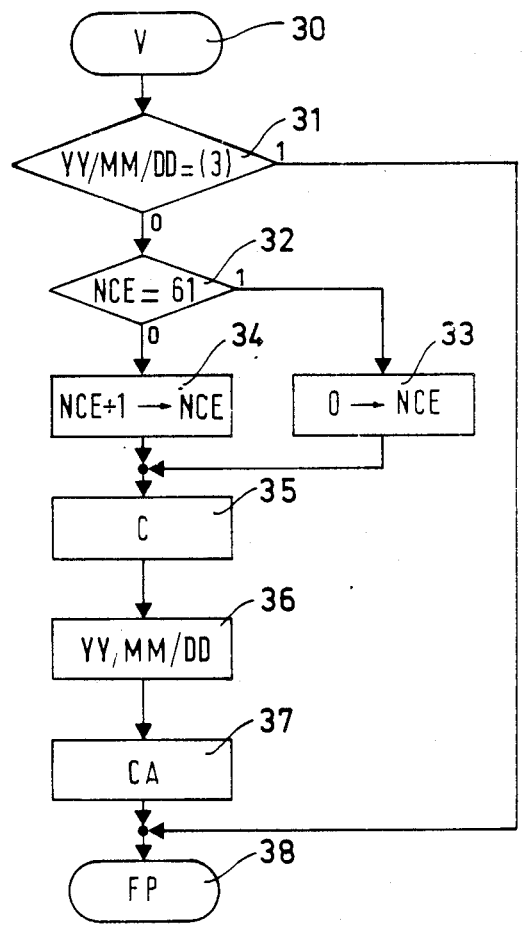
FIG. 6 is a flow chart showing how the machine state trail is controlled in the FIG. 4 memory.

FIG. 6 is a flow chart of the program for keeping the daily trail of the franking machine state up-to-date in memory space 10C of memory 10. This is done by a specific program contained in the program memory 6.

The program for updating the daily trail is automatically engaged the first time the machine is switched on in a day, assuming that the machine is not left permanently switched on. In a franking machine which is left switched on a permanent basis, the program is triggered at a predetermined fixed time, for example midnight which the microprocessor can observe by detecting a change in the day provided by the calendar clock.

The triggering of this program is indicated by an initial stage 30 marked V which relates to the machine being switched on and consists in verifying whether this is the first occasion on which the machine has been switched on in a given day.

When this program is executed, it uses variables recorded in memory space 10D and it uses the working memory as an address pointer C to designate the address of the compartment in the memory space 10C into which it is to write. If the memory is organized as 62 compartments C0 to C61 disposed in a closed loop, the instructions of this program run as follows:

Instruction 1:

read the three date bytes YY/MM/DD in memory space 10B and compare them with the corresponding three bytes of the calendar clock 3 during a stage 31 marked YY/MM/DD=(3);

if they are equal move onto the end-of-program instruction 3 (stage 38), since there is no change of day;

else if they are different move onto instruction 2.

Instruction 2:

read byte NCE designating the number of the last compartment to have been written to, as recorded in memory space 10B, and compare with 61 during stage 32, marked NCE=61;

if NCE=61, make NCE=0 and record it in memory space 10B during stage 33 marked 0→NCE;

else if NCE is not equal to 61, increment NCE by one and load the new value into memory space 10B during stage 34 marked NCE+1→NCE.

The new value of NCE designates the number of the compartment in which writing is to take place.

Designate the address C in the compartment NCE of the memory 10 to which writing is to take place in a stage 35 marked C;

Transfer the contents of the calendar clock into said designated compartment and into memory space 10B during a stage 36 marked YY/MM/DD;

Transfer the contents of the up meter CA into the same compartment of memory space 10C, at the following addresses during a stage 37 marked CA; and Move on to instruction 3.

Instruction 3:

end the program in a stage 38 marked FP.

This program for keeping the daily trail up-to-date thus serves to write the date followed by a copy of the up meter in the designated one of the compartments. Next day, a similar recording will be made in the next compartment, and so on. When a recording is made in the last compartment C61, the next recording is made in the first compartment C0 and the sequence of compartments constitutes a closed loop.

In a variant, the daily trail may be updated by considering the compartments C0 to C61 of the memory space 10C as constituting a shift register. Since updating takes place infrequently compared with franking operations, there is plenty of time for transferring the contents of each register into the next.

The monthly trail is updated in memory space 10D in a manner similar to updating the daily trail, and this is performed by a special program. This special program is triggered on a special occasion, a change in month.

In the month updating program the variable NDE can take possible values of 0 to 11. In comparison with the preceding program, an additional stage is provided relating to the number RM recorded with the monthly trail, which number is obtained by incrementing the number recorded in space 10B by +1. Memory space 10D could also be updated by considering its compartments as constituting a shift register.

In either event the updating of the daily trail or of the monthly trail is organized in such a manner as only the oldest of the records is lost.

Before describing the operation of consulting the trail memory 10, it is specified that this operation is accessible from a message MP0 which is itself accessible by pressing the menu key on the keyboard and which serves to define all special operations.

The message MP0 is constituted by successive screens which are displayed on the display. These screens are as follows:
Screen 1 Which do you want
Screen 2 1 - Machine states
Screen 3 2 - Auxiliary meters
Screen 4 3 - Change mode
Screen 5 4 - Change ceiling
Screen 6 5 - Immediate trail
Screen 7 6 - Daily trail
Screen 8 7 - Monthly trail
Screen 9 Make your selection Screens 1 and 9 are displayed for one second each, while screens 2 to 8 are each displayed for two seconds. A timing program corresponding to message MP0 and contained in the program memory runs accordingly to cause each screen to appear for the appropriate desired time.

Screens 1 to 9 are fixed screens, i.e. they comprise invariant text which is recorded in the text memory. A display program builds up an electronic image of each screen to be displayed in the working memory in a 32-byte region thereof in order to display two lines of 16 characters.

Screen 1 tells the user that various different options are being proposed and screen 9 invites the user to select one of them.

Screens 2 to 8 define special operations and they associate of them with a particular digit key for selection purposes.

While the screens of message MP0 are being displayed, the user can use the Cancel key if it is desired to return to the initial message from which normal franking operations or special operations may be selected.

These special operations are defined below with trail consultation being the only operation described:

machine states: this operation consists in having access via keyboard key 1 to the current state of the machine, with the recorded contents of any one of the meters or the calendar clock being displayed;

auxiliary meters: this operation provides access via keyboard key 2 to any one of the numbered meters existing in the machine, which meters are associated with specific budgets;

change mode: this operation gives access via key 3 to various possible operating modes of the franking machine when performing normal franking operations, these modes are: one-off mode in which the stamp value is cleared to zero after each franking operation and the new value must be keyed in for each stamping operation, burst mode in which the stamp value is maintained for an unlimited number of stamping operations, and limited burst mode in which the stamp value is maintained for a specified number of franking operations;

change ceiling: this operation obtained via key 4 gives access to a fixed ceiling constituting the maximum franking value which may be printed, and enables the user to change this maximum value; and immediate, daily, and monthly trails: these operations are obtained via keys 5, 6, and 7 respectively and give access to trail memories 9 and 10 for consulting all or a part of their contents.

Figure 7:
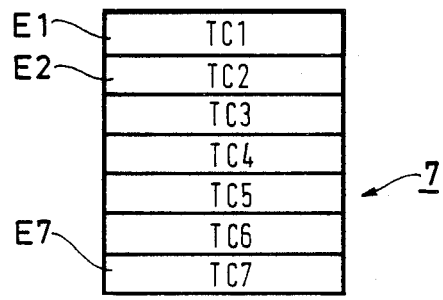
FIG. 7 shows the contents of another memory, namely the machine's "text memory" for use in consulting the FIG. 4 memory.

FIG. 7 shows the contents of the text memory with relation to message MP1 for consulting daily trails in memory 10 when this operation has been selected. The memory consists in successive screens specific to this operation of consulting trails in memory 10. These screens are displayed one after the other on the display. Some of them are entirely fixed, i.e. the text is invariable, while others have a fixed portion and a variable portion as described below. The texts defined by the screens are referenced TC in FIG. 7 and they are accompanied by a screen number E. The successive screens of message MP1 for consulting the daily trails are as follows:

| Screen 1 - E1: | Record of YY/MM/DD | TC1 |
| Screen 2 - E2: | Index = XXXXXXXX | TC2 |
| Screen 3 - E3: | Expenditure = $ XXXXX.XX | TC3 |
| Screen 4 - E4: | What do you want 1 - Next | TC4 |
| Screen 5 - E5: | 2 - Previous 3 - The first | TC5 |
| Screen 6 - E6: | 4 - The last 5 - To print | TC6 |
| Screen 7 - E7: | Make your selection | TC7 |

Each screen occupies 32 bytes with one byte per character.

Screens 1, 2, and 3 are displayed for two seconds each, whereas Screens 4 to 7 are displayed for one second each. A timing program contained in the program memory and which runs at the same time sets the display times.

Screens 4 to 7 are fixed screens, with Screens 4, 5, and 6 being screens giving proposals which can be selected by pressing the digit key associated with the desired proposal.

Screens 1 to 3 are screens having a fixed portion and a variable portion. The fixed portion of each of them is contained in the text memory. The variable portion is read from or deduced from the trail memory 10 and corresponds, prior to one of the proposals being selected, to the record made by the machine, the day, and the expenditure. In the text memory, the fixed portions leave room for the variable portions to be added for display purposes. The program for displaying the working memory allows a 32-byte electronic image to be set up in the working memory of the screen to be displayed on the display, incorporating both the fixed portion and the variable portion.

Keyboard key 1 causes the following record to be displayed unless, when said key is depressed, the record being displayed is the last record, i.e. the most recent record.

Keyboard key 2 causes the preceding record to be displayed, unless the record currently being displayed when the key is depressed is the first, i.e. the oldest record.

Keyboard keys 3 and 4 respectively cause the oldest and the most recent records to be displayed.

Keyboard key 5 causes a monthly filing sheet or journal to be automatically printed.

Pressing the Cancel key returns to the special operation message MP0.

These successive screens can be used for displaying trails on the display and for establishing the monthly filing sheet merely by consulting the daily trails recorded in the compartments of memory space 10C.

Figure 8:
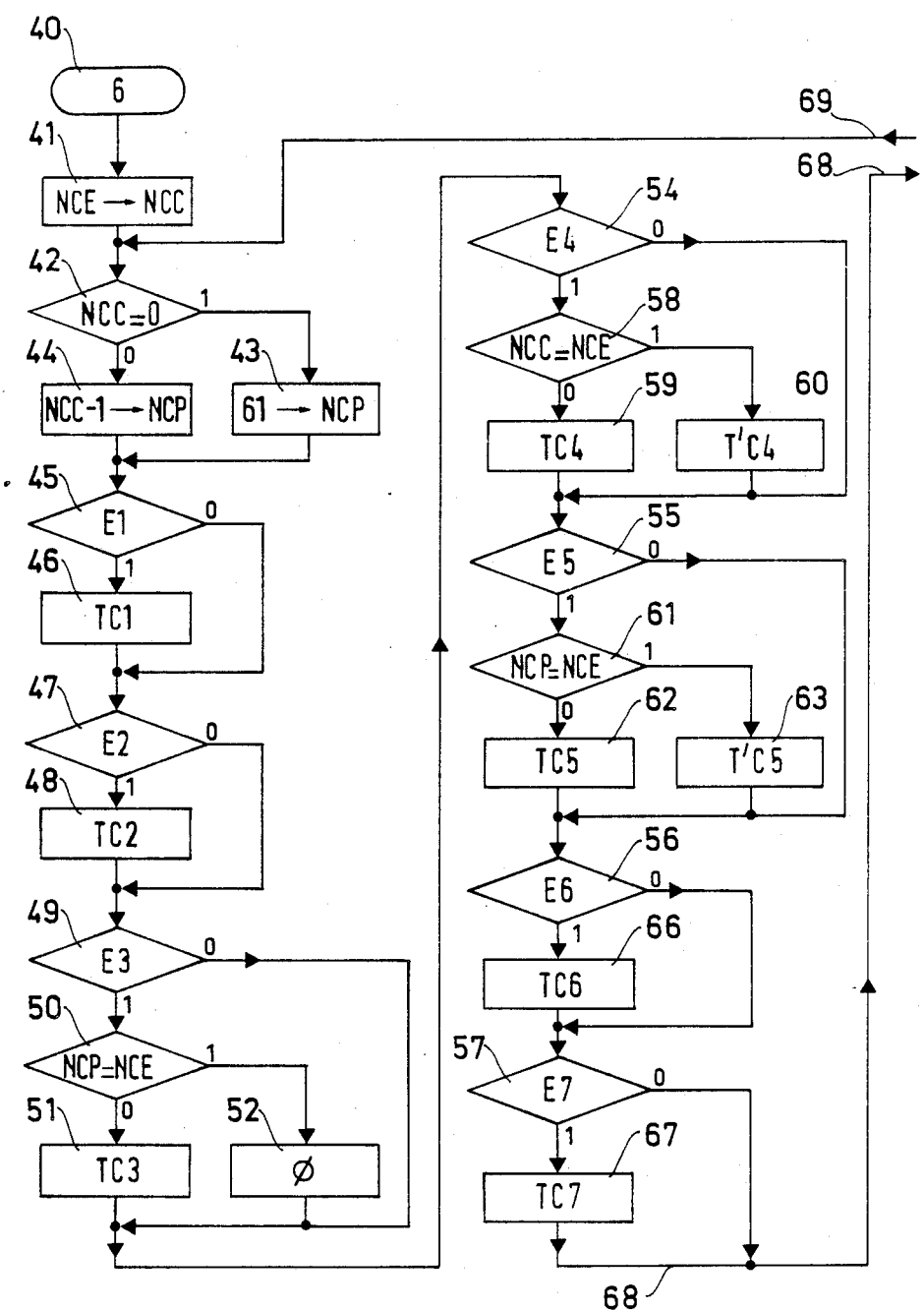
FIGS. 8 and 9 are flow charts of the program for consulting the FIG. 4 memory.
Figure 9:
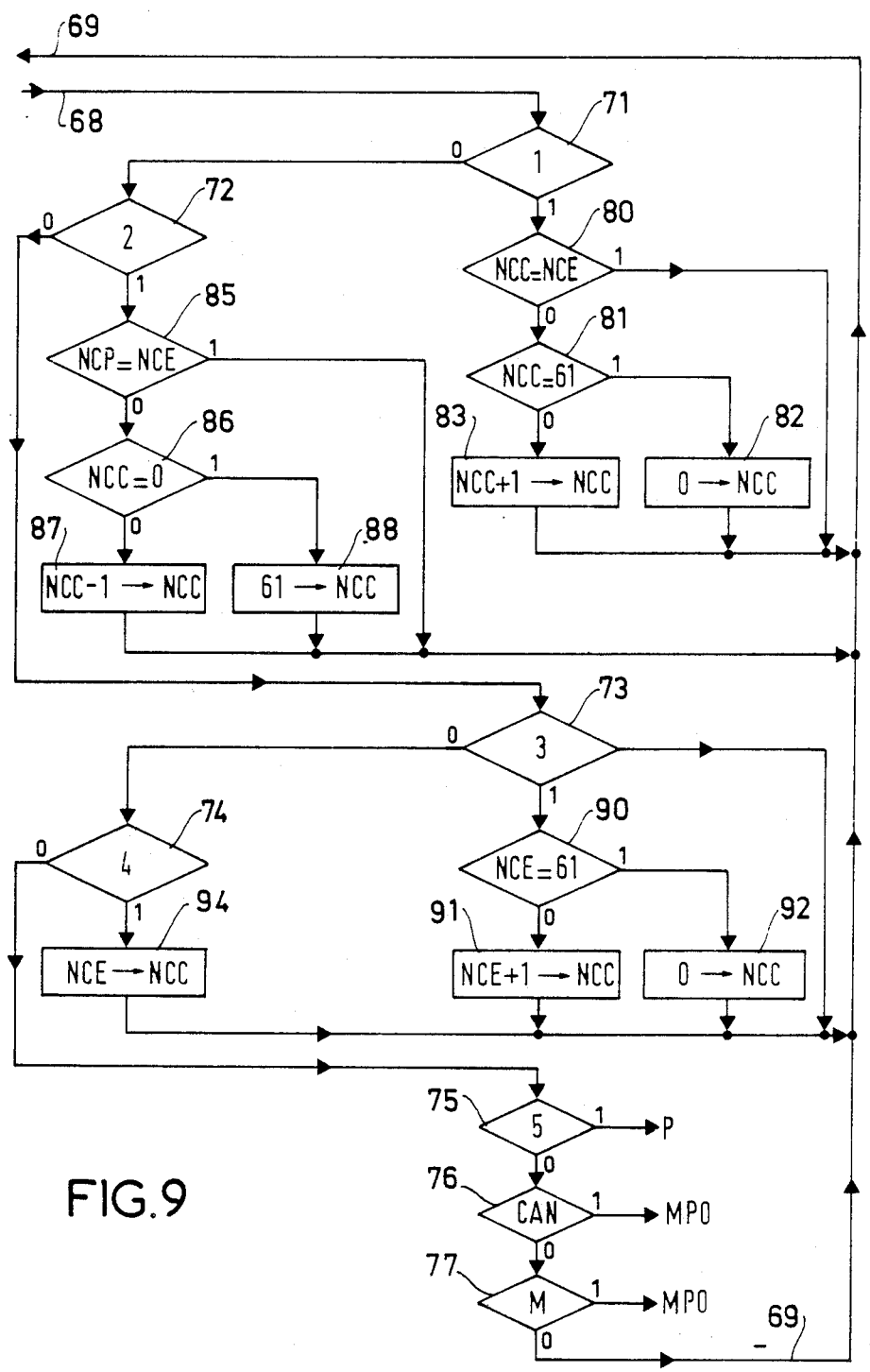

FIGS. 8 and 9 constitute a flow chart for the program for consulting the daily trails. It is contained in the program memory and is associated with the consultation operation for running purposes. It is brought into operation by depressing key 6 while the display is displaying screens of the special operations message MP0, during an initial stage 40 referenced 6. FIG. 8 corresponds to the portion of the program which controls the display, and FIG. 9 corresponds to the portion of the program relating to the keys. In these figures, decision stages are represented by diamond-shaped lozenges. At the outlets from the lozenges, the digit 1 means "yes" and the digit 0 means "no".

The display program (FIG. 8) comprises the following instructions:

Instruction 1:

read the number NCE of the last compartment to be written to in memory space 10BC, load the number of the compartment to be consulted NCC at the location provided for that purpose in zone 10BC of the memory 10 with NCC=NCE initially, as represented by stage 41 marked NCE→NCC;

compare NCC with 0 in stage 42 marked NCC=0, and if NCC=0 write 61 in the location in memory zone 10BC for recording the number NCP of the compartment preceding the currently consulted compartment, in a stage 43 marked 61→NCP;

if NCC is not equal to 0, write NCC - 1 into the location in memory zone 10BC for recording the number NCP of the compartment preceding the currently consulted compartment in a stage 44 marked NCC - 1→NCP;

move on to instruction 2.

Instruction 2:

build screens 1, 2, and 3 in succession, during stages 45, 47, and 49 marked E1, E2, and E3, establish the address of the compartment being consulted, display these screens one after another for two seconds each, and when Screen E1 is present as detected at stage 45, read the fixed text of Screen 1 from the text memory, read the date YY/MM/DD contained in the consulted compartment NCC, build an electronic image of Screen 1 and display the image during stage 46 marked TC1;

when Screen E2 is present (i.e., stage 45 is "no" and stage 47 is "yes") read the fixed text of Screen 2, read the state of the up meter recorded in the compartment being consulted, build the electronic image of Screen 2 and display it during a stage 48 marked TC2; if the state of the recorded up meter contains one or more redundancy or error detection bits, these remain hidden and are not displayed;

when Screen E3 is present (i.e., each of stages 45 and 47 are "no" and stage 49 is "yes"):

read the number NCP of the compartment preceding the presently consulted department and compare NCP with the number of the most recent compartment, with said most recent compartment being the last compartment to have been written to, (stage 50 marked NCP=NCE); and if NCP is not equal to NCE, read the fixed text of Screen 3, read the state CA of the meter in the compartment being consulted and the corresponding state of the preceding compartment, calculate the difference between the two states, and build the electronic image of screen 3 and display it during stage 51, marked TC3;

if NCP=NCE, display Screen 3 during stage 52 marked φ, where the symbol φ means a blank screen.

Instruction 3:

build Screens 4, 5, 6, and 7 in succession during stages 54, 55, 56, and 57 marked E4, E5, E6, and E7, display these screens one after the other for one second each, and when Screen 4 is present (i.e., stages 45, 47, and 49 and "no" and stage 54 is "yes"):

compare the numbers of the consulted compartment and the last recorded compartment in a stage 58 marked NCC=NCE; and if NCC and NCE are not equal, read the fixed text for said screen in order to display it during a stage 59 marked TC4;

if NCC=NCE, read the fixed text of said screen E4, delete the second line, and display using stage 60 marked T'C4.

When Screen 5 is present (i.e., stages 45, 47, 49 and 54 are "no" and stage 55 is "yes"):

compare the numbers NCP and NCE of the compartment preceding the presently consulted compartment and of the last compartment to be written to during a stage 61 marked NCP=NCE, and if NCP and NCE are not equal read the fixed text of this screen and display it during a stage 62 marked TC5;

else if NCP=NCE, read the text of the screen, erase the first line, and display using stage 63 marked T'C5.

When Screen 6 or Screen 7 is present (i.e., all stages 45, 47, 49, 54 and 55 are "no" and stage 56 or stage 57, respectively, are "yes"), read the text of the appropriate screen and display using stages 66 and 67 referenced TC6 and TC7.

This program for consulting daily trails is looped on itself via the key action program whose flow chart is given in FIG. 9. As a result references 68 and 69 which are common to both flow charts also appear on FIG. 9 representing the insertion of the key action program in the consultation display program. The program shown in FIG. 9 controls modifications that result from action on one of the keys 1 to 4 of the keyboard in order to change the compartment being consulted NCC, or on key 5 in order to automatically print out a monthly filing sheet, with presses to the Cancel key and the menu key being marked CAN or M as the case may be.

The flow chart of FIG. 9 shows the possible depressions of keys 1 to 5, CAN, and M by stages 71, 72, 73, 74, 75, 76, and 77. Only one of these keys can be depressed, as illustrated by each of the stages shown being connected to the 0 output of the preceding stage, i.e. the output indicative of no key depression.

The instructions of this subprogram are as follows:

If key 1 is depressed:

compare the number of the consulted compartment and the number of the previously written to compartment during stage 80 marked NCC=NCE, and if NCC=NCE loop back directly via 69;

else if NCC and NCE are not equal, compare NCC with 61 in stage 81 marked NCC=61; and if NCC=61 put NCC to 0 during stage 82 marked 0→NCC and loop back via 69;

else NCC is not equal to 61, so increment NCC by one in stage 83 marked NCC+1→NCC and then loop via 69.

If key 2 is depressed:

compare the number NCP of the compartment preceding the consulted compartment with the number of the most recent compartment NCE in stage 85 marked NCP=NCE (i.e. the user seeks to display the preceding compartment, unless the preceding compartment is the most recent compartment), and if NCP=NCE, loop back directly via 69;

else if NCP and NCE are not equal compare NCC with 0 in stage 86 marked NCC=0, and if NCC is not equal to 0, decrement NCC by one in stage 87 marked NCC - 1→NCC and loop;

else NCC=0, so set NCC to 61 during stage 88 marked 61→NCC, and then loop.

If key 3 is depressed:

compare NCE with 61 in stage 90 marked NCE=61, and if NCE is not equal to 61, put NCC equal to NCE+1 in stage 91 marked NCE+1→NCC and loop;

else if NCE=61, put NCC equal to 0 in stage 92 marked 0→NCC and loop.

The oldest record will then be displayed.

If key 4 is depressed:

put NCC and loop back to step 42 equal to NCE in stage 94 marked NCE→NCC; the user seeks to display the most recent daily trail.

If key 5 is depressed:

cause automatic printing P of the data delivered to the alphanumeric printer from the consulted compartment up to the most recent compartment.

If the Cancel key, marked CAN or the menu key M is depressed:

cancel the current action and return to the special operation message MP0.

The operation of consulting the daily trails as described above was set into operation by depressing key 6 on the keyboard while the special operation message MP0 was being displayed. In a variant, it may be put into operation by pressing function key T on the keyboard. Under these conditions, in FIG. 8, the initialization stage 40 marked 6 becomes an initialization stage which is obtained via key T.

The operations of updating the monthly trail in memory space 10B and of consulting said monthly trail, and the programs for providing these operations are analogous to those relating to the daily trail, and are therefore not described in detail.

The operation of printing a monthly filing sheet on the basis of the daily machine state trail, which may be consulted, takes place automatically. Prior to depressing key 5 of the keyboard instructing printing to take place, while displaying day trail consultation message MP1, the user causes the display to display the contents of the consulted department which is to appear first on the sheet. This program is not displayed in detail. It is set into motion by pressing key 5. Its instructions and flow are as follows:

Instruction 1:

read the preceding sheet number RM as recorded in the last-written compartment of memory space 10D, increment it by +1 and then print it, this being the number of the sheet to be established.

Instruction 2:

read the name and address of the user together with the number of the machine as defined in the fixed parameters PF recorded in memory space 10A when the franking machine was put into operation, and send them to the printer.

Instruction 3:

Read the date, the index, and the expenditure from the currently consulted day trail compartment, i.e. those currently being displayed, and send them to the alphanumeric printer for printing on a single line of the sheet corresponding to the day concerned.

Instruction 4:

if the record which has just been printed is not the most recent record (i.e. the record corresponding to the day on which the sheet is being printed), repeat instruction 3 by simulating a depression of key 1 as designated in MP1;

otherwise move on to instruction 5.

Instruction 5:

calculate the sum of the daily expenditures printed for the month in question and print the sum on the sheet; the microcomputer calculates this sum and then supplies it to the printer.

Instruction 6:

read the number of the post office to which the machine is attached from memory space 10A where it is recorded as one of the fixed parameters PF and print it.

In a manner similar to the operation of printing a monthly filing sheet, the user may cause a journal to be printed for the user's own requirements. Selecting the print operation by means of key 5 on the keyboard when the daily trail consultation message is being displayed may cause a proposal to be offered for selecting between printing said official sheet and a user journal. The program for printing the journal is the same as the program for printing the official sheet, except that instructions 1 and 6 are omitted.

In addition, given the characteristics of the printer, after the monthly filing sheet has been printed in the clear, at least the most important data as already printed in the clear on the sheet is also printed in encoded form. The printing of the data in encoded form allows it to be directly and automatically acquired by machinery belonging to the postal service.

The data under consideration may be printed, for example, in the form of a bar code. To this end, the machine uses a suitable prior art transcoding technique such as the "interlaced 2-out-of-5" code in which odd position digits are represented by 5 bars comprising 3 thin bars and 2 thick bars, whereas even position digits are coded as 5 inter-bar spaces comprising 3 narrow spaces and 2 wide spaces.

The essential data concerned is constituted, in particular by:

the number of the sheet;
the number of the machine;
the number of the post office to which the machine is attached;
the last day trail of the preceding sheet;
the date of the day on which the present sheet was made out; and
the expenditure of the month.

This bar code printed data enables the sheet to be exploited automatically by the postal service.

The essential data or all of the data already printed in the clear may, in a variant, be printed in an encoded form using some other form of encoding, for example it may be printed in the form of a prior art strip sold under the trademark SOFTSTRIP by CAUZIN Systems Inc. and such a strip can be printed directly on the sheet.

The operation of printing out a monthly filing sheet is advantageously indicated to the user by means of a screen which is automatically displayed when the machine is switched on for the first time on the day on which the sheet is to be made out. It may be displayed a few days before the due date in order to warn the user.

In the franking machine, the immediate trail of the machine state as updated each time the machine performs a franking operation and the monthly trail of the machine state updated on a fixed date each month are not printed, a priori. They serve essentially to increase operating security for the machine, both for the user and for the postal service.

The printing operation as described above is triggered by depressing the key 5 while message MP1 is being displayed. In a variant it may be triggered by depressing the function key marked P on the keyboard. Under such conditions, stage 75 referenced 5 in FIG. 9 becomes a stage analogous to a decision under the control of key P.

Naturally, and in particular for pre-payment machines, the daily trail of the machine state may be recorded like it is for post-payment machines. Preferably, the daily trail is replaced by a trail which is recorded when credit is loaded into the machine, and will relate no longer to the machine up meter but to the meter for cumulating the loaded credit.

The operation of consulting the immediate trail and the operation of consulting the monthly trail are both accessible, as are all other special operations of the machine, via the menu. These two operations belong to special operations message MP0 and are defined in Screens 6 and 8. In a variant, they may belong to the operation defined in Screen 2 of message MP0, and under such conditions, they may be accessible via individual corresponding message screens which are then displayed once said operation has been selected.

Selecting the operation of consulting the immediate trail causes a new message MP2 to be displayed, said message comprising the following successive screens:
Screen 1 Prior state No. a
Screen 2 On YY/MM/DD at HH/MM/SS
Screen 3 Up meter=$ XXXXXX.XX
Screen 4 Down meter=$ XXXXX.XX
Screen 5 Cumulative meter=$ XXXXXXX.XX
Screen 6 Piece count=XXXXXXXXX
Screen 7 Preceding state Enter In screen 1 a is the number of the immediate machine state trail under consideration, with a=0 meaning the current state in 9A, a=1 meaning the immediately preceding state in 9B, and a=2 meaning the state before that in 9C.

The fixed portions of these screens are stored in the text memory 7.

Figure 10:
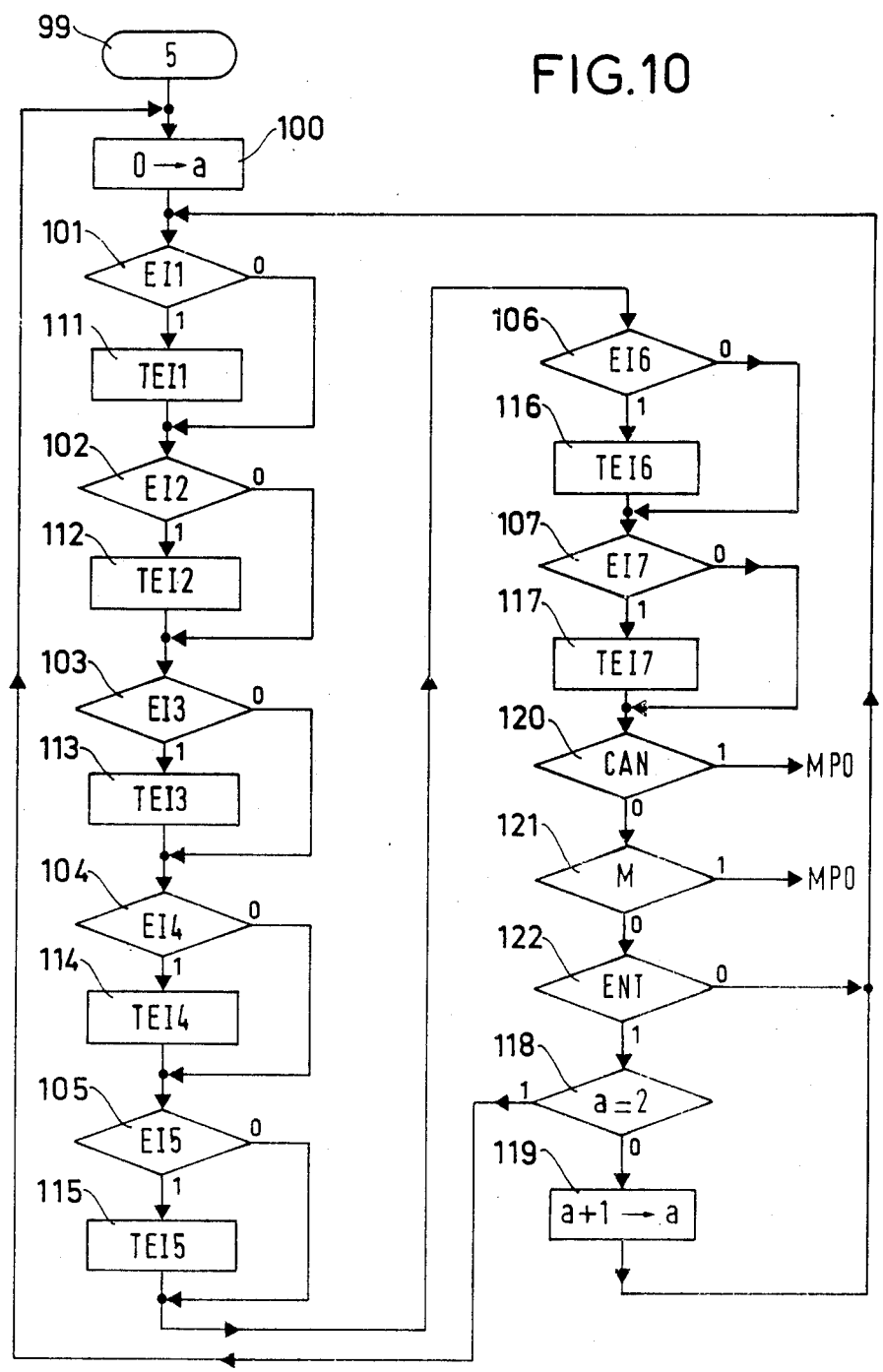
FIG. 10 is a flow chart of a program for consulting the FIG. 3 memory.

The operation of consulting the immediate trail is performed by a command program contained in the program memory. The flow chart for consulting the immediate trail is shown in FIG. 10, and makes use of one byte in the working memory for designating the read addresses in memory 9.

This program begins with an initial stage 99 marked 5 corresponding to depressing the key 5 on the keyboard while the message MP0 is present on the display. Its instructions run as follows:
Instruction 1:
set a to 0 during a stage 100 marked 0→a.
Instruction 2:
build each of the screens 1, 2, ... , 7 in succession during stages 101, 102, ... , 107, marked EI1, EI2, ... , EI7 in order to display them one after the other; and when Screen 1 is present read the fixed text for this screen from the text memory and build its electronic image using the value of a and display it during stage 111 marked TEI1; and while each of the screens 2 to 7 is present read the fixed text and the corresponding variable portion, where appropriate, build the relevant electronic image and display it during respective stages 112 to 117 marked TEI2 to TEI7.
Instruction 3:
run the actions that result from depressing one of the following keys as taken into account during stages 120, 121, and 122: the Cancel key marked CAN, the menu key marked M, and the Enter key marked ENT.

If the Cancel key CAN or the menu key M is depressed, return to the message MP0, and this program is terminated.

If the Enter key ENT is depressed compare a with 2 in stage 118 marked a=2, and
if a=2 reinitialize the program;
else if a is not equal to 2 increment a by +1 in stage 119 marked a+1→a and rerun the program with a new value for a.

During this operation, the current state of the machine together with the date of the most recent franking operation performed is displayed followed, where so desired and as indicated by the Enter key, by each of the successively preceding states until there are no further records in the memory 9.

When the day trail compartments in memory space 10C are organized during updating operations as a shift register, then consulting the day trail takes place in a manner analogous to consulting the immediate trail as described above. The same applies to the monthly trail compartments and memory space 10D.

I claim:
1. A franking machine providing a historical trail, the machine comprising a microprocessor, and connected to said microprocessor: a stamp print head; a keyboard; a calendar clock; a control memory; a working memory; at least one first nonvolatile memory referred to as the machine state memory for recording the state of the machine meters corresponding to the last franking operation performed; and a second non-volatile memory referred to as the trail memory, having at least a first memory space organized as a plurality of identical compartments which are individually addressable by first updating control means for writing in said first memory space, said updating means being triggered at time intervals specific to said first memory space for recording data relating to the machine state at the instants concerned in the various compartments thereof, said machine further including:

second control means for consulting each first memory space, said second control means controlling the addressing of the compartments thereof in order to read the trail recorded in the "consulted" compartment, i.e. in that one of the compartments which is being addressed; and said second control means including a text memory belonging to said control memory and containing firstly a first message which is accessible by means of a menu key on said keyboard and which defines a sequence of special operations for the machine, said operations being split into a sequence of first screens capable of being displayed on at least one line comprising a plurality of alphanumeric characters on an alphanumeric display connected to the microprocessor, with at least one of said first screens corresponding to a machine state trail consultation operation which may be selected by means of a digit key of said keyboard for designating said operation, and also containing, for use during trail consultation, a second message constituted by a sequence of second screens successively displayable on the display when the consultation operation has been selected, with some of said second screens displaying the trail recorded in the consulted compartment, with other screens defining proposals for changing the compartment being consulted, and with each of said proposals being selectable by means of a corresponding key designated together with the proposal concerned when the proposal is displayed.

2. A franking machine according to claim 1, wherein said second control means include a specific function key on said keyboard for directly putting the machine into trail memory consultation mode.

3. A franking machine according to claim 2, further including an alphanumeric printer coupled to the microprocessor, and wherein said keyboard includes a second special key for putting said machine into print mode to print out at least a portion of the contents of said trail memory.

4. A franking machine according to claim 1, wherein second control means further include a program memory belonging to said control memory and containing a program for consulting the trails recorded in said trail memory, which program can be run by depressing a digit key attributed to selecting said operation, said program comprising stages for designating the compartment to be consulted, initially on the basis of the last compartment written to, and subsequently on the basis of selected proposals, and for read addressing the consulted compartment in order to read the recorded trail therein and to build those of the second screens which display said trail.

5. A franking machine according to claim 4, further including, in association with said trail memory, at least one third memory space for recording the identification (referred to as the number of the last compartment written to in each first memory space, the date of the last write operation, and the number of the consulted compartment.

6. A franking machine according to claim 5, wherein second control means further include means for comparing firstly the number of the consulted compartment with the number of the last written compartment, and secondly the number of the compartment preceding the consulted compartment with the number of the last written compartment, said means being contained in the consultation program and serving respectively to inhibit a proposal to change the consulted compartment in a given direction in accordance with at least one of said second screens.

7. A franking machine according to claim 6, wherein said given direction is incremental when said compartment consulted is the last written compartment and is decremental when said compartment consulted is the first written compartment.

8. A franking machine according to claim 1, further including an alphanumeric printer coupled to said microprocessor, and wherein one of said second screens includes a print proposal selectable by depressing a digit key associated with said print operation and designated in conjunction therewith, thereby putting the machine into print mode to print out the trail recorded in said consulted compartment of the trail memory when said print proposal is selected 9. A franking machine according to claim 8, including programmed print control means for printing the trails recorded in the compartments of said trail memory starting from the consulted compartment and continuing to the last written compartment in order to automatically print out a sheet.

10. A franking machine according to claim 9, including means coupled to said printer for encoding the trails already printed out and causing them to be printed in an encoded form for the purpose of subsequent automatic acquisition thereof.

11. A franking machine according to claim 9, further including a fourth memory space associated with said trail memory and serving for recording fixed parameters related to the machine and to its user, said parameters being read while said printer is in use in order to cause them to be printed on said sheet, thereby automatically establishing a monthly filing sheet.

12. A franking machine according to claim 1, further including:
at least one second memory space associated with each machine state memory and together constituting an immediate machine state trail memory for recording the most recent franking operation and as many of the immediately preceding franking operations as there are second memory spaces;
third control means for updating said immediate trail memory; and
fourth control means for consulting said immediate trail memory, said fourth control means including said text memory which further contains, within said first message accessible by means of the menu key and defining a sequence of special machine operations, at least one further one of said first screens attributed to an operation of consulting the immediate machine state trail, said operation being selectable by depressing a designated digit key, and also containing a third message constituted by a sequence of third screens displayable in succession on the display when the operation of consulting the immediate machine state trail has been selected, with said third screens successively displaying a rank within the immediate trail, the date and the corresponding state of the machine, and a proposal to select and display an earlier state recorded in said second memory space.

13. A franking machine according to claim 12, wherein said fourth means further include a program in the program memory for the operation of consulting the immediate machine state trail.

14. A franking machine according to claim 13, wherein the immediate machine state trail memory has its second memory spaces and its machine state memory organized as a continuous and looped sequence.

15. A franking machine according to claim 13, wherein the immediate machine state memory has its second memory spaces organized as a continuous looped sequence.

16. A franking machine according to claim 12, wherein said first control means include said program memory and further contain a record trail update program having stages for designating a particular space compartment in a sequence of said compartments, and stages for causing the machine state and the calendar clock to be recorded in the compartment which is then designated and addressed.

17. A franking machine according to claim 16, wherein the said first intervals are defined for a first memory space of said trail memory as being each occasion on which new credit is loaded into the machine.

18. A franking machine according to claim 16, wherein said particular compartment comprises a next space compartment following the last written compartment in a sequence of said compartments when the last written compartment is not the last compartment in the sequence, and comprises the first compartment of the sequence when the last written compartment is the last compartment in the sequence.

19. A franking machine according to claim 16, wherein said first intervals are defined for a first memory space of said trail memory as being constituted by the first occasion on each day on which the machine is switched on.

20. A franking machine according to claim 19, wherein the first intervals for another first memory space of said trail memory are defined as being a fixed date in each month.

* * * * *